Sept. 28, 1971 G. T. GORE 3,608,269
APPARATUS FOR HANDLING AND PACKAGING INDIVIDUAL ARTICLES
Filed Sept. 24, 1969 4 Sheets-Sheet 3
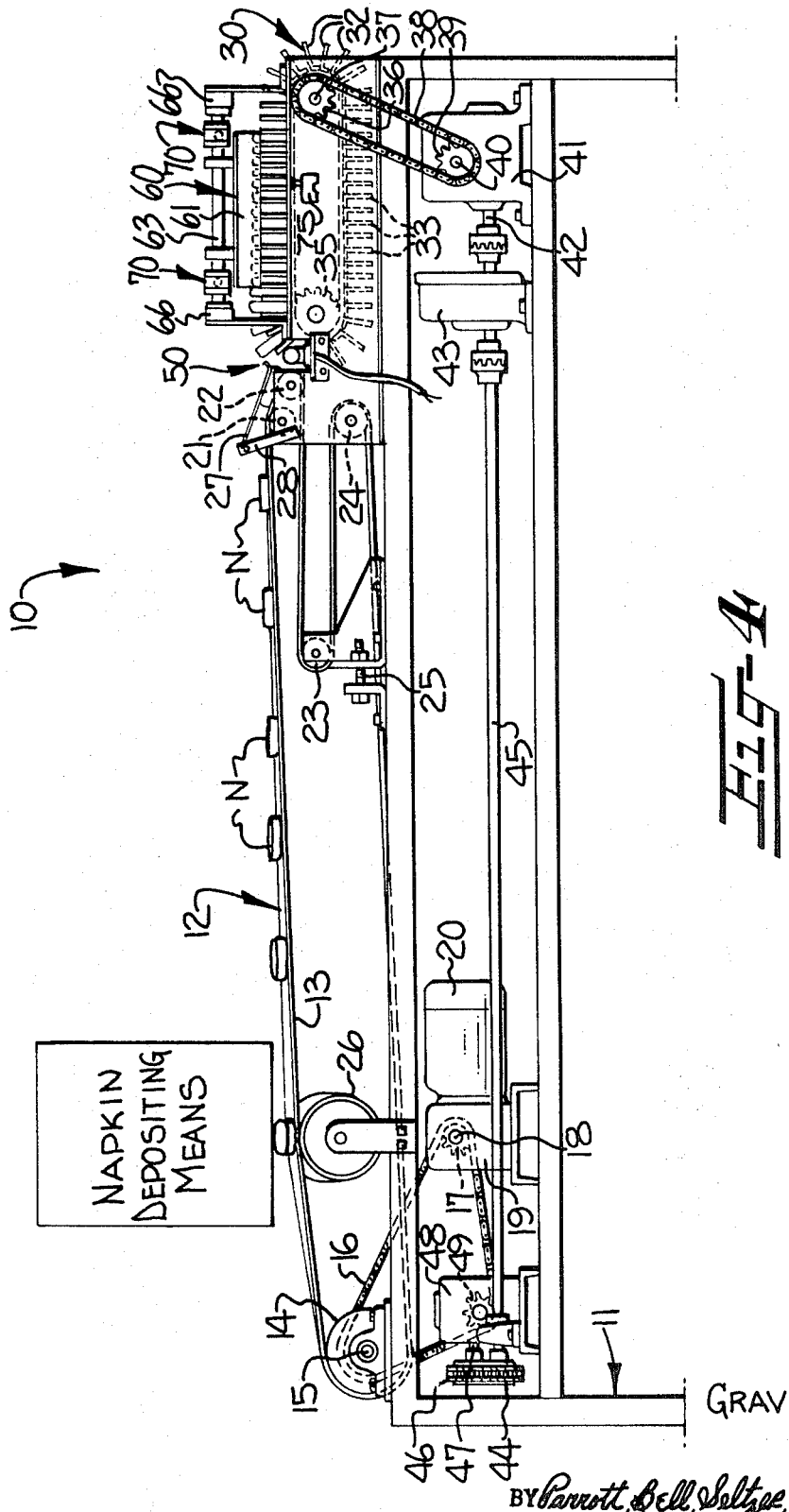
INVENTOR:
GRAVES T. GORE
BY Parrott, Bell, Seltzer, Park & Gibson
ATTORNEYS

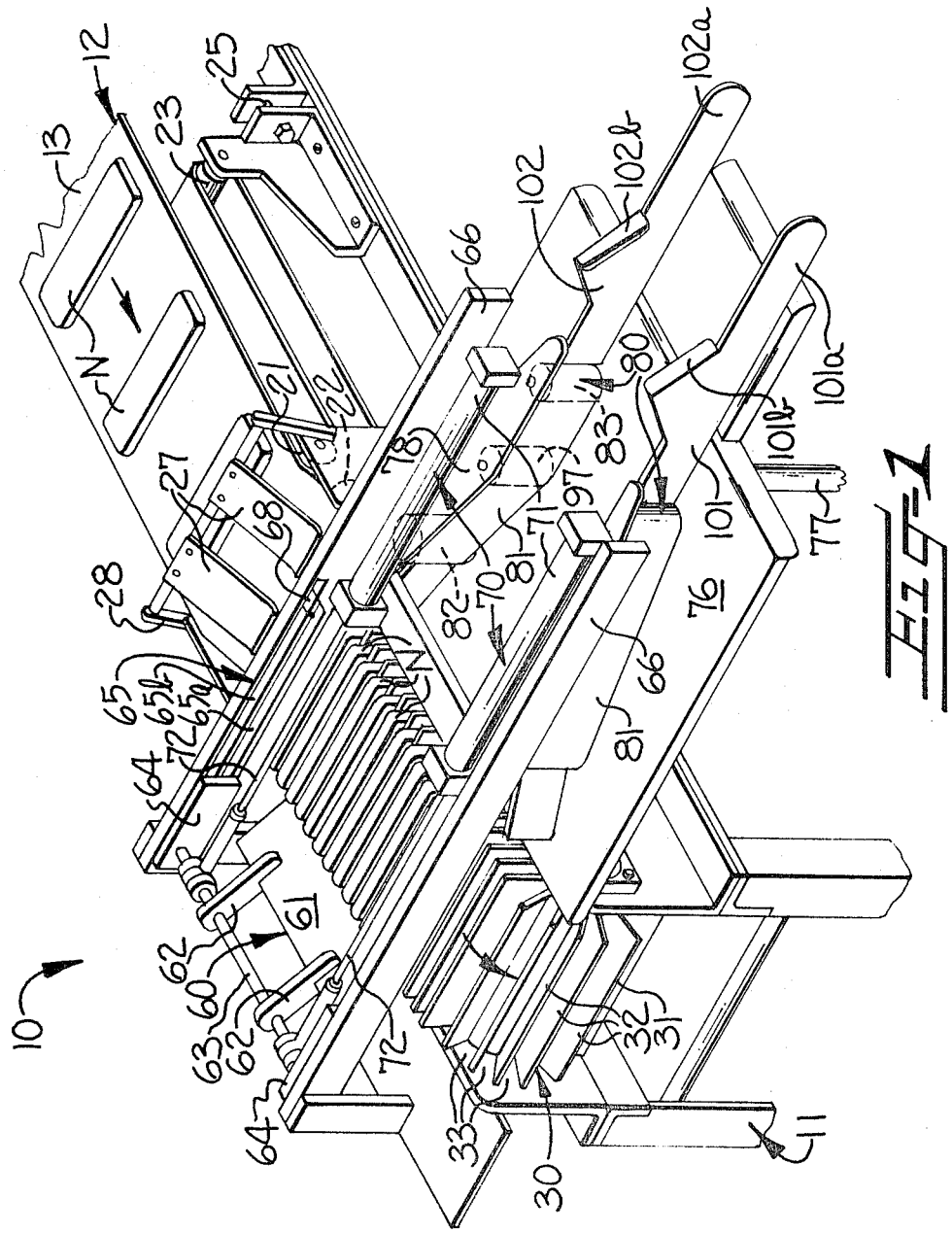

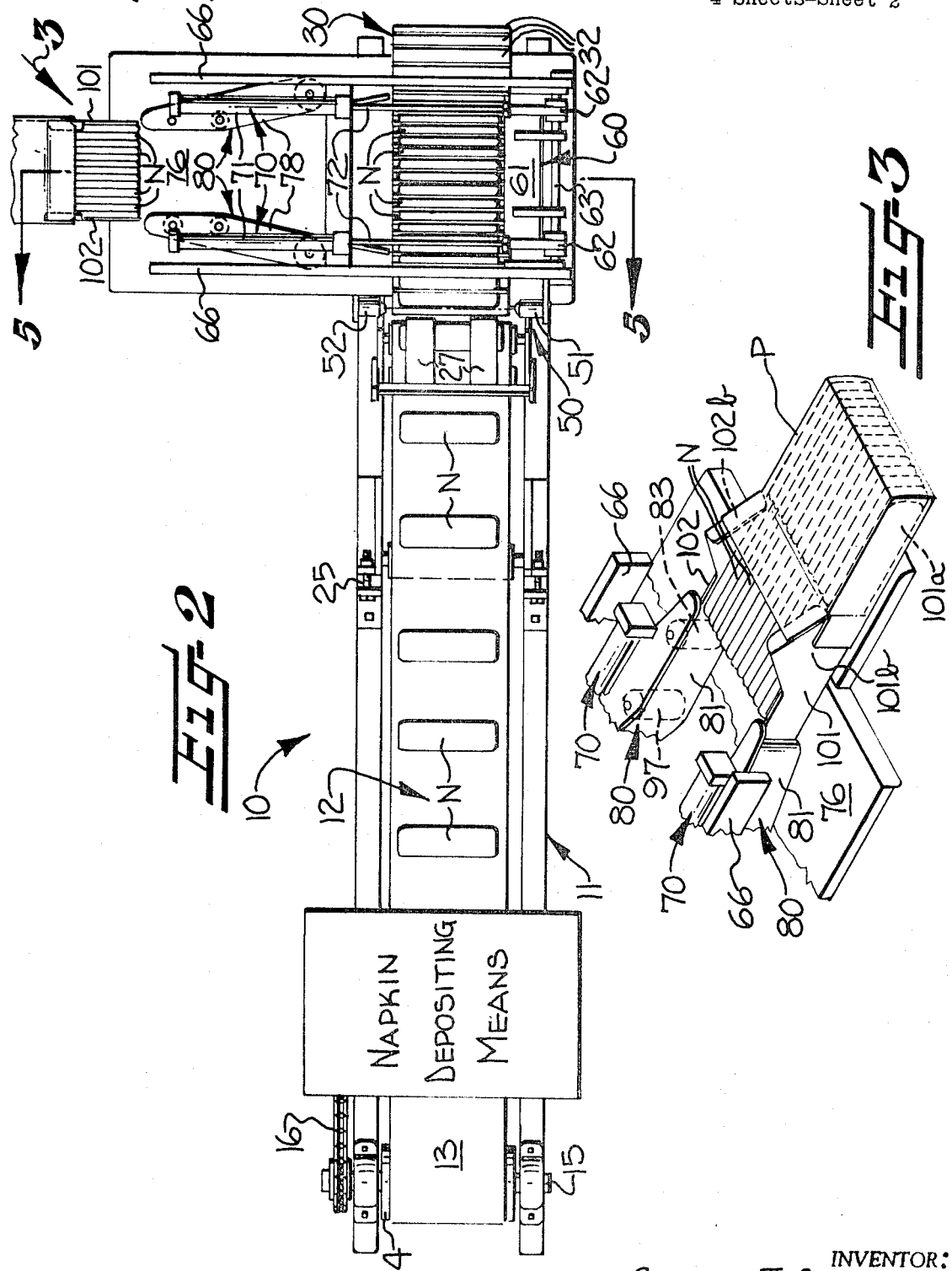

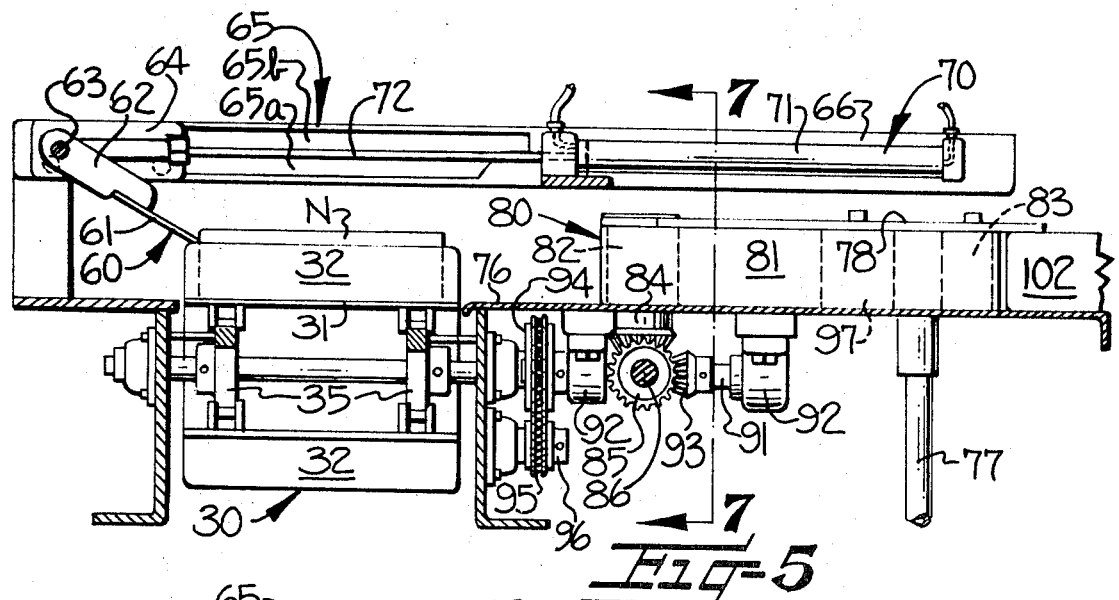
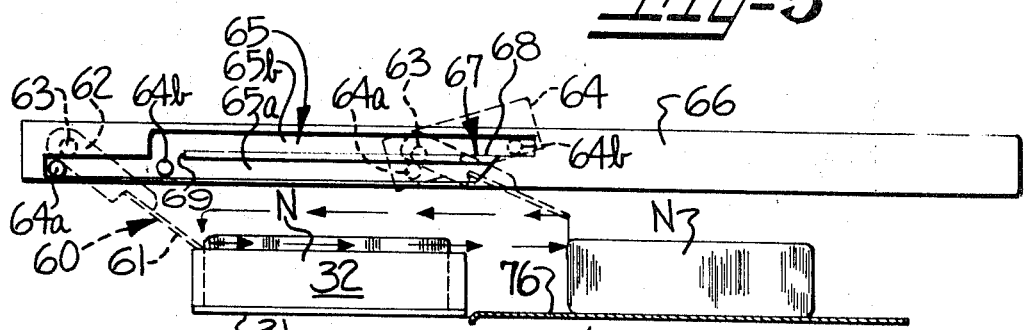
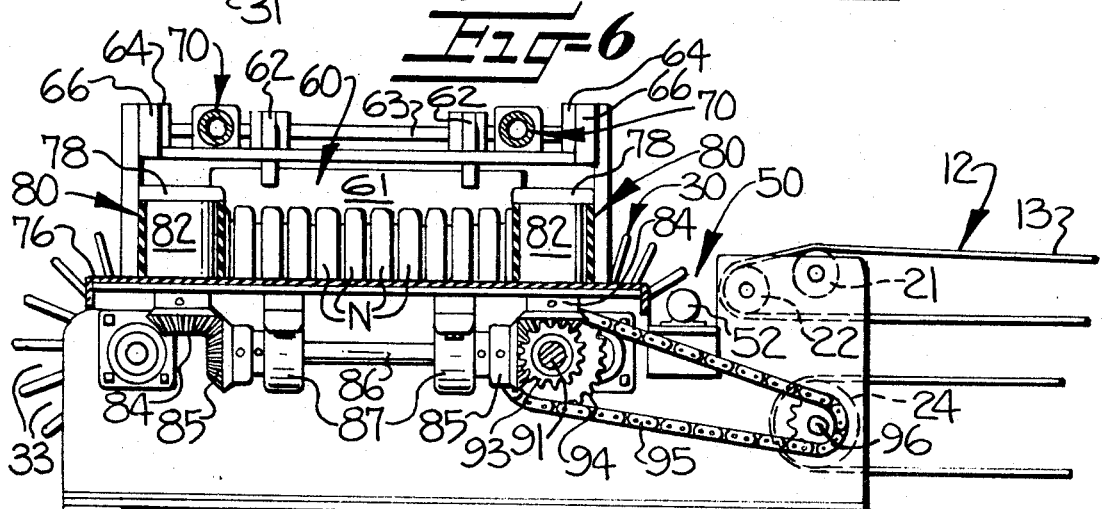

United States Patent Office  3,608,269
Patented Sept. 28, 1971

3,608,269
APPARATUS FOR HANDLING AND PACKAGING INDIVIDUAL ARTICLES
Graves T. Gore, Ware Shoals, S.C., assignor to Riegel Textile Corporation, Ware Shoals, S.C.
Filed Sept. 24, 1969, Ser. No. 860,619
Int. Cl. B65b *57/10*
U.S. Cl. 53—62                                    8 Claims

ABSTRACT OF THE DISCLOSURE

A feeding conveyor successively feeds individual articles along a predetermined path to an accumulating conveyor in series with the feeding conveyor. The accumulating conveyor includes side-by-side article receiving compartments and is successively advanced in timed relationship to the feeding conveyor to sequentially receive articles therefrom. After a predetermined number of articles have accumulated on the accumulating conveyor, they are simultaneously ejected from the compartments in side-by-side relation transverse to the path of advancement of the accumulating conveyor. Preferably, the apparatus includes a pair of spaced apart cooperating guide conveyors having portions converging from the accumulating conveyor for receiving the articles upon ejection, maintaining the articles in side-by-side relation, advancing the articles and compressing the articles. In addition, package aligning members communicate with the guide conveyors for aligning and holding an article receiving package relative to the ejected articles.

---

This invention relates to an apparatus for handling individual articles and more particularly to an apparatus for positioning a predetermined number of individual articles in proper relationship to each other for packaging or the like.

In the production of articles such as sanitary napkins and the like, cleanliness of the finished product is highly desirable if not imperative and, accordingly, manual handling of the articles for packaging should be eliminated. Also, a large number of operators is required for manual handling and packaging which is time consuming and costly. Numerous apparatus have been devised for handling and packaging articles such as sanitary napkins, but such apparatus have not proven to be entirely satisfactory for one or more reasons.

Thus, it is an object of the present invention to provide an apparatus for handling and positioning a predetermined number of individual articles in side-by-side relation for packaging or the like.

Another and more specific object of the present invention is to provide an apparatus for handling and positioning a predetermined number of relatively soft and compressible articles such as sanitary napkins in side-by-side relation, compressing the articles and inserting the articles into a package.

By this invention, the above objects and others are accomplished by providing an apparatus for handling individual articles comprising means, preferably a feeding conveyor, for successively feeding the articles along a predetermined path and accumulating conveyor means in series with the feeding means for receiving and placing the articles in side-by-side relation. The accumulating conveyor means includes side-by-side article receiving compartments and means for successively advancing the conveyor in timed relationship to the feeding means for successively bringing empty compartments into article receiving communication with the feeding means to sequentially receive articles from the feeding means. The apparatus further includes means for simultaneously ejecting a predetermined number of articles from the compartments in side-by-side relation transverse to the path of advancement of the conveyor means after a predetermined number of articles have accumulated on the conveyor means.

The preferred form of the apparatus of this invention includes guide means disposed adjacent the accumulating conveyor means and cooperating with the ejecting means for guiding the side-by-side articles from the accumulating conveyor means upon ejection thereof and for maintaining the articles in side-by-side relation, and means communicating with the guide means for aligning and holding an article receiving package relative to the ejected articles for receiving the articles therein to form a package.

Some of the objects of the invention having been stated, other objects will appear as the description proceeds, when taken in connection with the accompanying drawings, in which—

FIG. 1 is a perspective view with portions broken away illustrating the apparatus of the present invention;

FIG. 2 is a reduced schematic top plan view of the apparatus in FIG. 1;

FIG. 3 is an enlarged fragmentary perspective view of the portion of the apparatus indicated by the arrow 3 of FIG. 2;

FIG. 4 is a schematic side elevational view of the apparatus in FIG. 2;

FIG. 5 is an enlarged sectional view taken substantially along the line 5—5 of FIG. 2;

FIG. 6 is an enlarged side elevational view of a portion of the perspective view of FIG. 1; and FIG. 7 is a sectional view taken substantially along the line 7—7 of FIG. 5.

Referring more specifically to the drawings wherein like reference characters are employed to indicate like parts, there is illustrated in FIGS. 1, 2 and 4 the apparatus, generally designated at 10, of the present invention. The apparatus 10 will be described in connection with the handling of relatively soft and compressible sanitary napkins N, however, it will be understood that the invention applies equally well to other type articles.

The apparatus 10 comprises a suitable elongate support frame 11 on which is mounted a feeding conveyor 12, which is horizontally disposed for successively advancing individual napkins N along a predetermined horizontal path of travel. Napkins N may be deposited on the feeding conveyor 12 in any spaced apart relation by any suitable napkin depositing means, schematically designated in FIGS. 2 and 4, such as a napkin making machine, and preferably in a flatwise position with the longitudinal axis thereof transverse to the axis of the feeding conveyor 12, as illustrated.

The feeding conveyor 12 comprises an endless or continuous rotating conveyor belt 13 which passes at one end around drive pulley 14 mounted on drive shaft 15 having a sprocket (not shown) keyed thereto. A drive chain 16 passes around the sprocket (not shown) and drive sprocket 17 which is keyed to the output shaft 18 of gear-reduction box 19, the input of which is continuously driven by conveyor motor 20 to continuously drive pulley 14 and the feeding conveyor belt 13. The other end of the endless or continuous rotating feeding conveyor belt 13 passes over pulley 21 and around pulley 22 which is disposed at a lower elevation than pulley 21 to cause belt 13 to slope downwardly adjacent that end of feeding conveyor 12 for reasons to be hereinafter explained. The feeding conveyor belt 13 also passes around floating pulley 23 and pulley 24 wherein floating pulley 23 is adjustable for aligning feeding conveyor belt 13 relative to the various pulleys and for controlling the tension in feeding conveyor belt 13 by suitable means generally indicated at 25.

As illustrated in FIGS. 2 and 4, the napkins N are continuously advanced from left to right from where the napkins N are deposited on the conveyor belt 13. To facilitate the depositing of the napkins N on feeding conveyor belt 13, a support roll 26 is suitably mounted on support frame 11 below and in supporting relation to feeding conveyor belt 13 and in alignment with the napkin depositing means for supporting the belt 13 as the napkins N are deposited thereon. Smoothing plates 27 are cantilevered transverse of feeding conveyor belt 13 over the inclined portion thereof between pulleys 21 and 22 adjacent the end thereof for smoothing the relatively soft and compressible sanitary napkins N as they pass thereunder and causing the napkins N to adhere more closely to feeding conveyor belt 13 for reasons to become apparent upon further description of the present invention. The smoothing plates 27 are supported by suitable leg members 28 from support frame 11.

An accumulating conveyor, generally indicated at 30, is disposed in series with feeding conveyor 12 for receiving and placing the articles in side-by-side relation. The accumulating conveyor 30 comprises an endless or continuous rotating conveyor belt 31 horizontally disposed end to end with the feeding conveyor belt 12 to form a juncture therewith. Fins 32 extend outwardly from the belt 31 at equidistantly spaced points of substantially the thickness of the napkins N to define article receiving compartments 33 in side-by-side relation. The article receiving compartments 33 communicate with the feeding conveyor belt 13 at the juncture of the two belts. Preferably, the height of fins 32 is slightly less than the height of the napkins N to be received therebetween so that when a napkin N is received in a compartment 33 a portion of the napkin N will extend outwardly beyond the fins 32. The accumulating conveyor 30 rotates in the same direction as the feeding conveyor 13 and includes means for successively advancing the accumulating conveyor 30 in timed relationship to the feeding conveyor belt 13 for successively bringing empty compartments 33 into article receiving communication with the feeding conveyor belt 13 to sequentially receive napkins N from the feeding conveyor belt 13. In the present instance the accumulating conveyor belt 31 is intermittently indexed one compartment at a time.

The accumulating conveyor belt 31 passes around spaced apart pulleys 35 and 36, the latter of which has a drive sprocket 37 keyed therewith. A drive chain 38 passes around the drive sprocket 37 and a sprocket 39 which is keyed to the output shaft 40 of gear reduction box 41. The rotation of input shaft 42 of gear reduction box 41 is controlled by one revolution clutch 43 which is driven by drive sprocket 44 keyed to clutch input shaft 45. Drive sprocket 44 has a drive chain 46 passing therearound and around another drive sprocket (not shown) which is keyed to the output shaft 47 of another gear reduction box 48, the input of which includes sprocket 49 driven by drive chain 16 of the feeding conveyor 12. The one revolution clutch 43 is normally disengaged to maintain accumulating conveyor 30 stationary.

Engagement of clutch 43 is controlled by a photoelectric cell detecting means, generally indicated at 50, which is disposed at the juncture of feeding conveyor belt 13 and accumulating conveyor 30 for detecting napkins N as they are received by accumulating conveyor 30 from feeding conveyor belt 13. The photo electric cell detecting means includes a light source 51 and photo electric cell 52 aligned on opposite sides of the juncture and upon detecting a napkin N cause one revolution clutch 43 to engage and rotate input shaft 42 of gear reduction box 41 one revolution. Gear reduction box 41 is geared so that drive chain 38 indexes accumulating conveyor 30 one compartment each time the photoelectric cell detecing means 50 detects a napkin N being received from feeding conveyor belt 13 by accumulating conveyor 30.

Since the feeding conveyor belt 13 and accumulating conveyor 30 are disposed end to end, the article receiving compartments 33 of the accumulating conveyor 30 communicate with the feeding conveyor belt 12 at the juncture of the belts when the fins 32 defining the communicating compartment 33 will be diverging as illustrated in FIG. 4 to facilitate receiving a napkin N therebetween. The receiving of the napkin N between the fins 32 defining the communicating compartment 33 is further facilitated by the smoothing plates 27 which slightly compresses the napkin N and insures that irrespective of the speed of the feeding conveyor belt 12, successive napkins N will communicate in the same way with the accumulating conveyor 30. It will be noted that the napkins N turn from a flatwise position to a sidewise position during the transfer from the feeding conveyor belt 12 to the accumulating conveyor 30. The turning is facilitated by the downwardly sloping portion of the feeding conveyor belt 13 and the smoothing plates 27 which act in cooperation therewith to insure that the napkins N remain on the belt 13 until gravity takes over and passes the napkins N into the communicating articles receiving compartments 33.

As napkins N are successively fed along feeding conveyor belt 12, the napkins N sequentially accumulate in side-by-side article receiving compartments 33. After a predetermined number of napkins N have accumulated on accumulating conveyor 30, means are provided for simultaneously ejecting a predetermined number of the napkins N from the compartments 33 in side-by-side relation transverse to the path of advancement of the accumulating conveyor 30. The ejecting means is best illustrated in FIGS. 1 and 6 and comprises a rake, generally indicated at 60, mounted above the accumulating conveyor 30 for ejecting a predetermined number of napkins N from the accumulating conveyor 30 during reciprocating movement transverse thereof. The rake 60 includes a pusher plate 61 shown in FIGS. 1 and 6 in an inoperative position adjacent one side of the accumulating conveyor 30 and in position for engaging the portion of a predetermined number of napkins N extending beyond the fins 32. The pusher plate 61 is cantilevered by links 62 from a support rod 63 which is disposed parallel to the path of the accumulating conveyor 30. Opposed ends of the support rod 63 are mounted in sliding members 64 each having spaced apart bearing 64a and 64b (FIG. 6) which are mounted for sliding movement in tracks 65 of parallel spaced apart elongate support plates 66. The support plates 66 are supported above the accumulating conveyor 30 transverse thereof in any suitable manner by support frame 11. Each of the track 65 includes a lower raceway 65a and an upper raceway 65b constructed so that upon forward movement of the sliding members 64 bearings 64a and 64b follow lower raceways 65a and so that pusher plate 61 will engage the portion of a predetermined number of napkins N extending beyond fins 32 and simultaneously eject the napkins N transverse of the accumulating conveyor 30. The forward end of lower raceways 65a slope upward and communicate with upper raceways 65b through traps 67 which includes trap doors 68 to cause bearings 64b to move upward into upper raceways 65b as shown in phantom lines in FIG. 6. Once the bearings 64b are in upper raceways 65b, the trap doors 68 close and prevent bearings 64b from returning to lower raceways 65a. It will be noted that this causes sliding members 64 to pivot and raise pusher plate 61 a sufficient distance such that upon return to its normally inoperative position it will not interfere with napkins N accumulating on accumulating conveyor 30. Thus, upon reverse movement of the sliding members 64 bearings 64a will follow lower raceways 65a and bearings 64b will follow upper raceways 65b. The rear end of upper raceways 65b communicate through openings 69 with lower raceways 65a. When bearings 64b reach the openings 69, they will be pulled by gravity back into lower raceways 65a and the rake 60 will have been returned to its normally inoperative position.

The forward and reverse stroke or reciprocating movement of rake 60 is imparted by a pair of fluid operated piston and cylinder assemblies 70. The cylinders 71 of the assemblies 70 are mounted on support plates 66 parallel to and in alignment with the tracks 65 and have the free end of the pistons 72 pivotally connected to opposite ends of support rod 63. The assemblies 70 normally have the piston 72 in an extended position and are synchronized (not shown) for simultaneous operation whereby each of the sliding members 64 are moved positively in response thereto.

Actuation of the piston and cylinder assemblies 70 may be controlled by any conventional counter means 75 which in the present instance is mounted adjacent the accumulating conveyor 30, and is operatively associated therewith for actuating the piston and cylinder assemblies 70 after a predetermined number of napkins N have accumulated on the accumulating conveyor 30. During the forward stroke of the rake 60 the pusher plate 61 engages the ends of a predetermined number of napkins N and simultaneously ejects them from the compartments 33 transverse of the accumulating conveyor 30 onto receiving plate 76 supported by support member 77. At the end of the forward stroke, the pusher plate 61 is raised to avoid engagement on the reverse stroke with napkins N that have accumulated on the accumulating conveyor 30.

Guide means are disposed adjacent the accumulating conveyor and cooperate with the rake 60 for guiding the napkins N in side-by-side relation from the accumulating conveyor 30 upon ejection therefrom and for maintaining the napkins N in side-by-side relation. More particularly, the guide means comprises a path of identical spaced apart cooperating guide conveyors 80 mounted on receiving plate 76 adjacent the accumulating conveyor 30 and extending outwardly therefrom in receiving communication with napkins N ejected by rake 60. The guide conveyors 80 are endless or continuous rotating conveyors and each comprises a continuous conveyor belt 81 which passes around vertically disposed pulleys 82 and 83 which are journaled between receiving plate 76 and mounting plates 78 and at least one of which is a drive pulley. In the present instance pulleys 82 are drive pulleys as best illustrated in FIGS. 5 and 7. Since the guide conveyors 80 are identical and cooperate with each other, it is essential that the belts 81 be driven at the same speed. In order to drive drive pulleys 82 at the same speed (FIGS 5 and 7), each drive pulley 82 has an identical bevel gear 84 keyed therewith which meshes with identical bevel gears 85 that are interconnected by connecting shaft 86 which is suitably supported from receiving plate 76 by bearings 87.

The drive for these intermeshing gears includes a drive shaft 91 (FIG. 5) supported from support frame 11 by suitable bearings 92 transverse to the accumulating conveyor 30 and has a bevel gear 93 keyed thereon meshing with one of the bevel gears 85. Drive shaft 91 also has a drive sprocket 94 keyed thereon. A drive chain 95 passes around sprocket 94 and another sprocket 96 keyed with the pulley 24 of the feeding conveyor belt 13. Thus, the guide conveyors 80 are continuously rotated at the same speed and will receive the ejected napkins N therebetween in side-by-side relation, maintain the napkins N in side-by-side relation and advance them away from the accumulating conveyor 30.

The guide conveyors 80 have portions converging toward each other from the accumulating conveyor 30 for compressing the napkins N while being advanced therebetween. It will be observed in FIG. 1 that pulleys 83 are spaced closer together than pulleys 82 and thus, cause the guide conveyor belts 81 to converge. However, only an initial portion of the guide conveyors 80 converge so that after the napkins N have been compressed the desirable amount, the napkins N may be made to advance along a linear path for easy insertion into a package. Guide rolls 97 are positioned between pulleys 82 and 83 in guiding relation to guide conveyor belts 81 for causing the belts to rotate parallel to each other between the guide rolls 97 and pulleys 83. Accordingly, upon ejection of a predetermined number of napkins N from the accumulating conveyor 30 they will be received on receiving plate 76 between guide conveyors 80 in side-by-side relation. The guide conveyors 80 will maintain the napkins N in side-by-side relation, advance the napkins N and compress the napkins N as they advance between the converging portion thereof.

Adjacent and communicating with the ends of the guide conveyors 80 are a pair of spaced apart package aligning and holding members 101 and 102 (FIGS. 1 and 3) for aligning and holding a napkin receiving package P relative to the guide conveyors 80 so that the guide conveyors 80 may advance the compressed napkins N into a package P aligned thereon. More particularly, the package aligning and holding members 101 and 102, include spaced apart elongate arm portions 101a and 102a for positioning between opposite walls of a napkin receiving package P and for holding the package P in alignment with the compressed napkins N as they are advanced from between guide conveyors 80. The aligning and holding members 101 and 102 also include lugs 101b and 102b extending upwardly from arm portions 101a and 102a for maintaining the end flaps of a package P out of the path of advancement of the advancing napkins N as they are inserted by the guide conveyors 80 into package P.

The operation of the apparatus 10 heretofore described is readily apparent from the foregoing description. Therefore, only a brief summary of the operation will be made. The power to conveyor motor 20 is turned on to continuously drive rotating feeding conveyor 12 to successively feed the relatively soft and compressible sanitary napkins N received from the napkin depositing means along a predetermined horizontal path from left to right. The accumulating conveyor 30 in series with the feeding conveyor 12 is successively advanced in timed relationship to the feeding conveyor 12 to sequentially receive napkins N in the side-by-side article receiving compartments 32. After a predetermined number of napkins N have accumulated on the accumulating conveyor 30, the fluid operated piston and cylinder assemblies 70 are actuated to reciprocate rake 60 transverse to the accumulating conveyor 30. During the forward stroke of rake 60 a predetermined number of napkins N are ejected transverse of the accumulating conveyor 30 in side-by-side relation between guide conveyors 80. The guide conveyors 80 maintain the napkins N in side-by-side relation, advance the napkins N and compress the napkins N while being advanced between the guide conveyors 80. From the guide conveyors 80, the napkins N are inserted into a package P aligned and held by package aligning and holding members 101 and 102.

In the drawings and specification, there has been set forth a preferred embodiment of the invention, and although specific terms are employed, they are used in a generic and descriptive sense only and not for purposes of limitation.

What is claimed is:

1. In an apparatus for handling and packaging individual articles
    means for successively feeding the articles along a predetermined path,
    accumulating conveyor means in series with said feeding means for receiving and placing the articles in side-by-side relation, said conveyor means including side-by-side article receiving compartments and means for successively advancing said conveyor means in timed relationship to said feeding means for successively bringing empty compartments into article receiving communication with said feeding means to sequentially receive articles from said feeding means, means for simultaneously ejecting a predetermined number of the articles from said compartments in side-by-side relation transverse to the path of advancement of said conveyor means after a predetermined number of articles have accumulated on said conveyor means, guide means disposed adjacent said accumulating conveyor means and cooperating with said ejecting means for guiding the side-by-side articles from said accumulating conveyor means upon ejection thereof and for maintaining the articles in side-by-side relation, said guide means comprising a pair of spaced apart cooperating guide conveyors disposed adjacent said accumulating conveyor means for receiving the side-by-side articles therebetween upon ejection from said accumulating means, for maintaining the articles in side-by-side relation and for advancing the articles, and means communicating with said guide means for aligning and holding an article receiving package relative to the ejected articles for receiving the articles therein to form a package.

2. The apparatus as set forth in claim 1 wherein each of said guide conveyors are continuous rotating conveyors.

3. The apparatus as set forth in claim 1 for handling and packaging relatively soft and compressible articles such as sanitary napkins and the like wherein said spaced apart cooperating guide conveyors have portions converging from said accumulating conveyor means for receiving the side-by-side articles therebetween upon ejection from said accumulating conveyor means, maintaining the articles in side-by-side relation, advancing the articles and compressing the articles while being advanced between the converging portions of said guide conveyors.

4. The apparatus as set forth in claim 1 wherein said feeding means comprises a continuously rotating conveyor and wherein said accumulating conveyor means is intermittently indexed one compartment at a time and including sensing means operatively associated with said accumulating conveyor means and said feeding conveyor for detecting when articles are received thereby and causing said accumulating conveyor means to be indexed one compartment to successively bring an empty compartment into article receiving communication with said feeding conveyor.

5. The apparatus, as set forth in claim 1, wherein said accumulating conveyor means comprising a continuous conveyor belt having fins extending outwardly from said belt at equidistantly spaced points therealong and refining article receiving compartments in side-by-side relation, said fins being spaced apart substantially the same as but slightly greater than the thickness of the articles to be received therebetween, said fins having a height less than the height of the articles to be received therebetween so that a portion of the articles will extend above said fins; and wherein said ejecting means comprises a rake means mounted above said accumulating conveyor means for reciprocating movement transverse thereof for engaging the portion of a predetermined number of articles extending above said fins and eject the articles from said accumulating conveyor means during the reciprocating movement thereof, and counting means for actuating said rake means after a predetermined number of articles have accumulated on said accumulating conveyor means.

6. The apparatus as set forth in claim 5 wherein said rake means includes means for causing engagement thereof with the portion of a predetermined number of articles extending above said fins and to eject the articles from said continuous conveyor belt during the forward stroke thereof and for causing said rake means to avoid engagement with the articles on said accumulating conveyor belt during the reverse stroke thereof.

7. The apparatus as set forth in claim 1 wherein said feeding means comprises a horizontally disposed continuous rotating feeding conveyor belt and wherein said accumulating conveyor means includes a horizontally disposed continuous conveyor belt disposed end-to-end with said feeding conveyor belt to form a juncture therewith and having fins extending outwardly from said belt at equidistantly spaced points therealong and defining article receiving compartments in side-by-side relation, said article receiving compartments successively communicating with said feeding conveyor belt at the juncture of said belts and arranged in such a manner that two of said fins which define the said compartment communicating with said feeding conveyor belt will be diverging from said accumulating conveyor belt to facilitate receiving of an article therebetween.

8. In an apparatus for handling and packaging sanitary napkins a continuously rotating feeding conveyor belt horizontally disposed for successively feeding napkins along a predetermined path in a flatwise position with the longitudinal axis thereof transverse to the axis of said feeding conveyor belt, an accumulating rotating continuous conveyor belt horizontally disposed end-to-end with said feeding conveyor belt to form a juncture therewith and having fins extending outwardly from said belt at equidistantly spaced points therealong and defining napkin receiving compartments in side-by-side relation, said fins being spaced apart substantially the thickness of the napkins, said napkin receiving compartments successively communicating with said feeding conveyor belt at the juncture of said belts whereby the napkins will be received in said compartments sidewise, said accumulating conveyor belt being successively advanced in timed relationship to said feeding conveyor belt to successively bring empty compartments into napkin receiving communication with said feding conveyor belt to sequentially receive napkins therefrom, means for simultaneously ejecting a predetermined number of the napkins from said compartments in side-by-side relation transverse to said accumulating conveyor belt after a predetermined number of napkins have accumulated thereon, a pair of spaced apart cooperating guide conveyors disposed adjacent said accumulating conveyor belt and having portions converging from said accumulating conveyor belt for receiving said side-by-side napkins therebetween upon ejection from said accumulating conveyor belt, maintaining the napkins in side-by side relation, advancing the napkins and compressing the napkins while being advanced between the converging portions of said guide conveyors, and means communicating with said guide conveyors for aligning and holding a napkin receiving package relative to the compressed napkins so that said guide conveyors will advance the napkins into a package aligned and held by said package aligning and holding means.

References Cited
UNITED STATES PATENTS

| | | | |
|---|---|---|---|
| 2,019,080 | 10/1935 | Johnson et al. | 53—124D |
| 2,661,103 | 12/1953 | Fay et al. | 53—59UX |
| 2,907,447 | 10/1959 | Offutt et al. | 53—124E |
| 2,962,848 | 12/1960 | Wilson | 53—124D |
| 3,139,714 | 7/1964 | Hall | 53—159 |

THERON E. CONDON, Primary Examiner

R. L. SPRUILL, Assistant Examiner

U.S. Cl. X.R.

53—124D, 124CC, 159